June 22, 1937.  W. R. WILEY  2,084,717

ATTACHING CLIP FOR MOLDING STRIPS

Filed Jan. 24, 1936

William R. Wiley
INVENTOR

BY Swan Frye and Hardesty
ATTORNEYS.

Patented June 22, 1937

2,084,717

UNITED STATES PATENT OFFICE 2,084,717

ATTACHING CLIP FOR MOLDING STRIPS

William R. Wiley, Detroit, Mich.

Application January 24, 1936, Serial No. 60,666

3 Claims. (Cl. 189—88)

This invention relates to resilient clip members for effecting the attachment of a molding strip to a supporting panel, as, for example, the body or door panel of an automobile, and has for its object an improved device of this type whereby the rapid and accurate positioning of a molding strip on a panel may be effected, with the assurance that unless its subsequent removal is definitely desired, it will remain firmly in the selected position, without liability to rattling or mischievous displacement. The clips are inexpensively stamped out and formed in quantity, and the method of attachment of their head portions to the molding clip, within the space enclosed by its contour, results in no indentation or deformation of the exterior surface of the molding strip.

Figure 1:
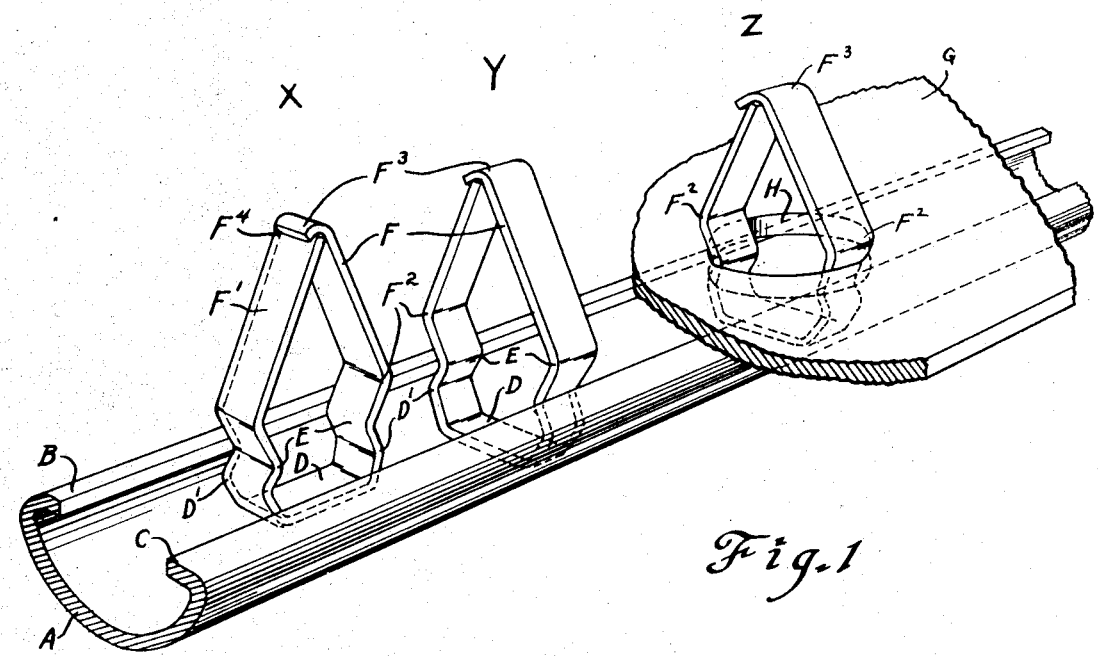
Figure 1 is a perspective of a molding strip and of a fragmentary portion of a panel, showing my improved clip in the successive stages of its installation.
Figure 2:
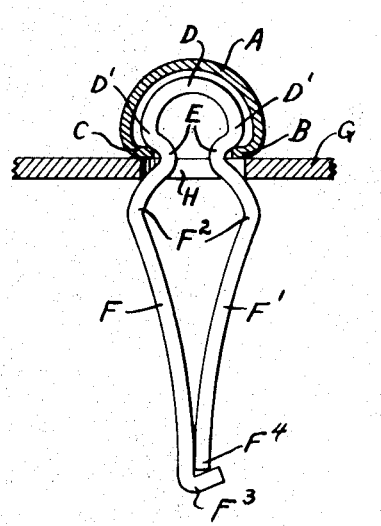
Figure 2 is an edge elevational view of a slightly modified form of clip in position with respect to the molding strip and supporting panel, its position being inverted from that shown in Figure 1.
Figure 3:
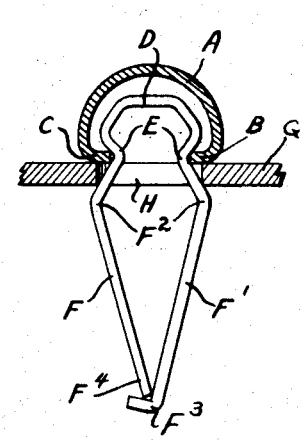
Figure 3 is a similar edge elevational view of a further modified form of clip.
Figure 4:
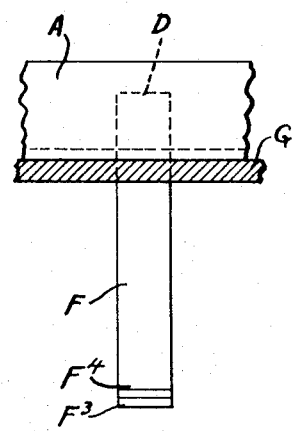
Figure 4 is a side sectional elevation of a portion of the molding strip and supporting panel, with the installed position of the attaching clip shown in relation thereto.

A indicates a molding strip provided with the usual inturned edges B and C, and G a panel upon which the molding strip is to be positioned. Preparatory to the positioning of the molding strip thereon, the panel is spacedly apertured or perforated with suitably sized clip holes as H along the line which the molding strip is designed to occupy on its exposed surface. Since that face of the panel not engaged by the molding strip is generally concealed from view, as by the upholstery of a motor car, or the interior panel finish of a door, the fact that attaching clips have portions which project through the panel sheet and beyond its interior surface is of no consequence, the main object being the firm and yet rapid attachment of the molding strip to the exterior of the panel.

The preferred form of attaching clip forming the object of this invention consists of a unitary stamping of sheet metal, bent at its center portion, as D, so as to form a curved or slightly angular head portion which is adapted to fit within the space enclosed by the molding strip. The next adjacent portions E of the stamping are inwardly bent toward one another to form a neck of an appreciably lesser breadth than the head portion D. Thence continuing out toward the initially terminal portions of the stamping, the body portion is formed of a tapering cross section, constituted by the branches F and F', the shoulder portions F² of which are in turn broader in their expanse than the neck portion E, being shown in the drawing as approximately the same breadth as the widest extent of the head portion D. These branches meet at the lowermost point of the clip, and the tip end, as F³, of one branch is protectively bent over the plain end F⁴ of the other branch. This arrangement is for the purpose of avoiding the tangling or interlocking of two or more clips when with one another as they are assembled and handled in bins or similar receptacles in large quantity, which interlocking though not damaging to the clip, requires manual separation from one another as they are picked up by the operator, either for manual installation in the molding strip or for positioning in multiple in a machine whose purpose is the installation of the clips within the molding strip.

It will be noted that the neck or throat portion E of each clip is of a breadth approximately the same as, or possibly slightly greater than, the space between the opposing edges of the inturned flanges B and C of the molding strip A. Such light gauge metal is now used for the formation of these molding strips, that if a clip with a head of sufficient size to resiliently engage the molding strip is forced between the flanges B and C, while being held in the position designated as Y in Figure 1, definite deformation or inbending of these flanges will occur, even though the head of the clip be successfully forced between them. To avoid this, I first position an individual clip between the flanges B and C of the molding strip and within the enclosed space thereof in the position designated at X in Figure 1, that is, lengthwise of the marginally covered trough to which the upturned molding strip alone may be compared. Then by turning the clip through a 90° angle the shoulders D' of the definitely broad head portion D on either side of the curved top of the clip engage under the inturned flanges B and C of the molding strip; and the resiliency of the metal used for fabrication of these clips is such that though easily installed in this described position indicated at Y in Figure 1, the clip definitely remains in the position lengthwise of the molding strip which has been selected for it, this in turn being determined by the position of the holes, as H, in the panel G, through which the tapered body portion of the clip is designed to be passed. Similarly, the shoulders F² at the top of the body portion extend outwardly over the outer surfaces of the inturned flanges B and C so as to make the passage of the body portion through the hole H in the panel G temporarily force the branches F and F' toward each other until the plane of the panel G has been passed. Both the inturned flanges B and C and the edges of the panel metal surrounding the holes H thus find lodgement in the inbent contouring on each side of the clip furnished by the neck E, and satisfactorily firm anchorage of the clip upon the outer surface of the panel results. This is indicated in Figure 1 as position Z.

The resilient adherence of the individual clip members to that position lengthwise of the molding strip which the described turning through a 90° angle has resulted in, effects their positioning so firmly that a molding strip with a plurality of such clips thus positioned thereon can be piled with others ready for use when the panel has been made ready, with the assurance that they will be in the desired positions, corresponding to the holes H in the panel, when the mounting of the molding strip thereon is desired. If, however, there should be minute variations in the distance of the holes H from one another, as contrasted with the positioning of the clips along the molding strip, the clips may be manually moved lengthwise thereof to a degree corrective of such discrepancies in the positions And since the positioning of the molding strip with its then inserted clips upon the panel involves the more or less free swinging of that end of the molding strip which in the sequence of fitting is the last to have its clips clinched into place through the prepared holes in the panel, it has been my experience that without the protective contouring of the lower end of the body portion of the attaching clip, which is shown at F³ and F⁴ in the drawing, there is a likelihood of scratching of the surface of the panel by the points of the clips at the remote end of the molding strip from that whose clips are first being seated in their several panel holes, which it is highly desirable to avoid. The utility of this overbending shown at F⁴ is therefore evident from this standpoint, as well as the avoidance of the interlocking of clips when stored in quantity which has been already remarked upon.

What I claim is:

1. In combination, a generally channel shaped molding strip having inturned flanges at its lateral edges, a sheet metal panel having an aperture therein and a clip for securing said molding strip to said sheet metal panel, said clip comprising a sheet metal strip formed into a closed loop and having the ends thereof interlocked to prevent relative movement therebetween, said clip being bent to provide indentations in opposite sides thereof, the central portion of said metal strip being generally arched to urge the bases of said indentations into engagement with the flanges on said molding strip to seat the clip therein, the end portions of said strip coverging toward each other to provide a prong adapted for insertion into the aperture in said sheet metal panel.

2. In combination, a generally channel shaped molding strip having inturned flanges at its lateral sides, a sheet metal panel having an aperture therein and a clip for locking said molding strip to said sheet metal panel, said clip comprising a sheet metal strip formed into a closed loop and having one end reversely bent to overly the opposite end, to interlock said ends to limit relative movement therebetween, said clip being bent to provide indentations in opposite sides thereof, the portion of said strip between said indentations being generally arched to resiliently urge the bases of said indentations into engagement with the flanges on said molding strip to seat said clip in position therein. The end portions of said clip diverging from the bases of said indentations and then converging to provide a resilient prong adapted for insertion into the aperture in said sheet metal panel.

3. In combination, a generally channel shaped molding strip having inturned flanges at its lateral sides, a sheet metal panel having an aperture therein and a clip for locking said molding strip to said sheet metal panel, said clip comprising a sheet metal strip formed into a closed loop and having the ends thereof interlocked to limit relative movement therebetween, said clip being bent to provide indentations on opposite sides thereof, the portion of said strip between said indentations being generally arched to resiliently urge the bases of said indentations into engagement with the inturned flanges on said molding strip, the remaining portions of said clip diverging from the bases of said indentations to provide cam surfaces for urging said molding strip into engagement with said sheet metal panel and then converging to provide a prong for facilitating the insertion of said clip into the aperture in said panel.

WILLIAM R. WILEY.